United States Patent Office 3,127,279
Patented Mar. 31, 1964

3,127,279
AQUEOUS BLACK COATING COMPOSITION CONTAINING MOLYBDENUM IONS AND PROCESS OF BLACKENING A METAL SURFACE THEREWITH
Mirza L. Baig and Bruno Leonelli, Detroit, Mich., assignors to Allied Research Products, Incorporated, Baltimore, Md., a corporation of Maryland
No Drawing. Filed Sept. 27, 1960, Ser. No. 58,650
15 Claims. (Cl. 106—287)

This invention relates to metal blacking and more especially to the use of molybdenum as a protective coating for metallic parts.

In the past, various procedures have been proposed for producing black finishes on metals. Many of such finishes have not had satisfactory adhesion to the base metal. Additionally, an electric current from an outside source is usually required to obtain black finishes. Furthermore, different compositions are usually required for application to different metals. In the past as much as 0.5 pound of solids or more per gallon of aqueous mix are required to give a satisfactory black coating.

It is an object of the present invention to develop a product that when dissolved in water will give a solution that can be used to obtain an improved black coating on metals (including their alloys).

Another object is to prepare such a composition which does not require the use of an electric current.

A further object is to prepare such a composition which can be used with a wide variety of metals (including their alloys).

An additional object is to prepare an aqueous molybdenum containing composition which can be used to produce a black coating on metals (including their alloys), said composition not containing over 3 ounces of solids per gallon so that losses due to drag-out will be minimum.

Yet, another object is to prepare an aqueous composition which will produce a black coating by immersion on metals (including their alloys) at temperatures within the range of 135° F. to 180° F.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the preparation of a mixture containing:

| | Parts |
|---|---|
| Nickel ions (divalent) | 0 to 2 |
| Chloride ions | 0.5 to 35 |
| Molybdenum ions (penta and hexavalent) | 0.5 to 20 |
| Acetate ions | 0.01 to 10 |
| Fluoride ions | 0 to 4 |

The composition is dissolved in water in an amount to give from ½ to 3 ounces per gallon.

It is preferable to have the nickel present since it acts as a catalyst and also as an activator on metals on which it is difficult to produce films. The nickel is normally used in an amount less than the amount of molybdenum but when present should be employed in the above composition in the amount of at least 0.1 part.

The fluoride ion increases the rate of deposition of the film for all metals and is required for outstanding deposition on aluminum (including aluminum alloys). The fluoride ion is employed in the amount of at least 0.067 part in the above composition.

The presence of both the acetate ions and the chloride ions permits the use of smaller amounts of total solids in the aqueous mix. The molybdenum is preferably added as ammonium molybdate because of its solubility and the "common ion effect" advantages due to the presence of ammonium ions in its molecule. However, molybdic acid can be used although it is not as soluble in water.

The product of the present invention produces a black coating on zinc and zinc alloys, galvanized zinc, cadmium, aluminum and alloys of aluminum (especially low silica alloys), magnesium and magnesium alloys, steel, nickel, and some stainless steels simply by immersing the metal in the aqueous solution of the product at moderate temperatures, e.g., at least 120° F. and preferably from 135 to 180° F. Only ½ to 3 ounces, preferably about 2 ounces, of solids are employed per gallon of aqueous solution, as a result the losses due to drag-out are minimal.

Only a small amount of the product need be added to the plating bath at a time to replenish the bath.

While the present composition has the advantage that the black coating is obtained by the simple process of immersion, if desired, a very low voltage can also be applied. It has further been found that the black coating produced gives protection to the base metal against corrosion. The black coating film obtained is metallic in nature, has a glossy appearance and has excellent adhesion to the base metal. By a suitable pretreatment a black matte finish can also be obtained.

As stated above, the same basic composition can be used to produce the desired black coating on a wide variety of metals. All that is necessary is a simple adjustment of pH and temperature. The pH of the fresh aqueous solution is between 4.0 and 5.0, depending upon the amount of the dry product dissolved in water. The operating range is from about 2.5 to 6.0. The pH can be adjusted to the desired value by the addition of small amounts of hydrochloric acid, fluosilicic acid, sulfuric acid, acetic acid, formic acid, any of the acids of phosphorus, e.g. phosphonic acid and phosphorous acid or aqueous ammonia or alkali e.g. sodium hydroxide or potassium hydroxide.

For most base metals the pH is preferably in the upper end of the pH range but for certain steels, nickel and stainless steels a pH value in the lower end of the range is more desirable.

The process is suitable for rack, basket, and barrel-type installations which are automatic, semi-automatic or manually operated. The transfer time is not a problem in the present process.

For most consistent results the base metal should be cleaned in the conventional metal cleaners used in the metal finishing industries and then this is followed by a conventional pretreatment. After the cleaning and also following the pretreatment it is best to wash the base metal with water. Below are given briefly the preferred pretreatments. The diluent in each case is water.

ZINC, PLATED ZINC, GALVANIZED ZINC, ZINC DIE CAST AND OTHER ZINC-BASE ALLOYS

Dip the work in 0.25 to 0.5% by volume of cold hydrochloric acid (22° Bé.) or sulfuric acid (66° Bé.) for 10 to 30 seconds, e.g. for 15 seconds in 0.4% hydrochloric acid.

CADMIUM, ALUMINUM, ALLOYS OF ALUMINUM, MAGNESIUM, ALLOYS OF MAGNESIUM

Dip the work for 10 to 45 seconds in 1 to 6% volume of sulfuric acid (66° Bé.) or hydrochloric acid (22° Bé.). For example with cadmium use 2% of the hydrochloric acid for 20 seconds, with aluminum and its alloys use 3% sulfuric acid for 15 seconds. In the case of cadmium it is preferable to add a few grams, e.g. 2 grams of ammonium nitrate (or a mixture of sodium nitrate and aqueous ammonia) per liter of the pretreatment dilute acid solution.

NICKEL, STEEL AND STAINLESS STEELS

Dip the work for 20 to 60 seconds in 10 to 20% hydrochloric acid or sulfuric acid. For example there can be used 15% sulfuric acid for 40 seconds.

In those cases where the metal has a passive film on it which is not easily removed, e.g. as sometimes occurs in the case of copper, nickel and certain stainless steels conventional activation treatments can be employed.

Unless otherwise indicated all percentages and parts are by weight.

Example 1

| | Parts |
|---|---|
| Nickel chloride (6 mols of water) | 8 |
| Ammonium chloride | 48 |
| Ammonium molybdate (4 mols of water) | 35 |
| Sodium diacetate (anhydrous) | 3 |
| Sodium acetate | 3 |
| Sodium bifluoride | 3 |

The above dry composition was added to water in an amount of ½ ounce per gallon. The aqueous formulation gave a good black coating on zinc, zinc die cast and cadmium. Similar results were obtained when the concentration was increased to 2 ounces per gallon.

The same dry formulation when added to water to give a concentration of 1 to 2½ ounces per gallon gave a good black coating on aluminum, aluminum alloys and steel.

Example 2

| | Parts |
|---|---|
| Nickel chloride hexahydrate | 8 |
| Ammonium chloride | 51 |
| Ammonium molybdate tetrahydrate | 35 |
| Sodium diacetate (anhydrous) | 3 |
| Sodium acetate | 3 |

An aqueous solution containing ½ ounce per gallon of water gave a good black coating on zinc, zinc base alloys, cadmium, magnesium and its alloys at a pH of 5. Similar results were obtained when the concentration was raised from ½ ounce per gallon to 1½ ounces per gallon. For best results it was found that the pH should be in the range of 4.0 to 6.0.

The immersion of the metal in the bath was at a temperature of 135 to 150° F. for times ranging from 30 seconds to 5.0 minutes. In general the higher the temperature and the lower the pH the shorter the immersion time.

The nickel chloride and ammonium chloride were the main sources of chloride ions required. Less preferably other chlorides could be employed. The sodium diacetate and nickel chloride furnished part of the acid required to make the solution acidic. The combination of sodium diacetate and sodium acetate acts as a buffering agent in the aqueous solution. Either of these two salts can be used alone.

Molybdenum ions (hexavalent, pentavalent, tetravalent, trivalent and divalent) are furnished by the ammonium molybdate on partial reduction in the aqueous solution. It is believed that these different polyvalent molybdenum ions take part in the formation of the black film in some complex way.

Example 3

In order to produce a black coating on steel, nickel and some stainless steels 1 to 2½ ounces of the dry composition of Example 2 is dissolved in water and 1 to 5 ml. of formic acid is added to give a pH of 3 to 4.5. The steel or nickel is immersed for 2 to 10 minutes in the bath at 140 to 180° F. Specifically 2 ounces of the dry composition can be dissolved in 1 gallon of water and 2.5 ml. of formic acid added and steel immersed for 3 minutes at 160° F.

The formic acid serves as both an acid and a reducing agent. The formic acid can be replaced by hydrochloric acid or acetic acid provided other reducing agents such as formaldehyde, formates, hypophosphites or the like are also used. The nickel ions catalyze the process of forming the black coating.

Example 4

| | Parts |
|---|---|
| Nickel chloride hexahydrate | 8 |
| Ammonium chloride | 51 |
| Ammonium molybdate tetrahydrate | 35 |
| Sodium diacetate (anhydrous) | 3 |
| Sodium acetate | 3 |
| Sodium hypophosphite monohydrate | 10 |

This composition is dissolved in water in an amount to provide ½ ounce to 3 ounces per gallon of water at a pH of 4.0 to 6.0 and a temperature of 140 to 155° F. in order ot produce a black coating on aluminum or the like. Specifically there can be used 2 ounces per gallon at a pH of 5 and a temperature of 150° F. In place of the hypophosphite there can be used a water soluble fluoride or bifluoride, e.g. sodium fluoride or bifluoride, or a combination thereof. In place of the hypophosphite there can be employed other reducing agents such as formic acid, formaldehyde, formates or thiosulfates.

The nickel ions enhance the formation of the black coating, e.g. on aluminum, but a satisfactory black film can be obtained without the nickel ions being present.

After the metal is coated with the black film, a subsequent water rinse is employed to wash off any blackening solution still on the metal surface or held in cavities. The metal parts can be dried either in a hot air blast, or a hot water dip may be used to facilitate drying.

Example 5

The composition of Example 4 at a concentration of ½ to 1½ ounces per gallon can be used as in Example 2 to coat zinc, cadmium or the like. Similarly the composition of Example 4 at a concentration of 1 to 2½ ounces per gallon of water can be used as in Example 3 to coat steel, nickel or the like.

We claim:

1. A composition consisting essentially of 0.5 to 35 parts of a water soluble chloride, 0.5 to 20 parts of a molybdenum source selected from the group consisting of ammonium molybdate and molybdic acid and 0.01 to 10 parts acetate ions.

2. A composition consisting essentially of salts including 8 parts nickel chloride, 51 parts ammonium chloride, 35 parts ammonium molybdate and 6 parts sodium acetate.

3. A composition according to claim 2 including 10 parts sodium hypophosphite.

4. A composition according to claim 1 including a small but effective amount of a water soluble reducing agent selected from the group consisting of formic acid, formaldehyde, a formate, a hypophosphite and a thiosulfate.

5. A composition for blackening metals consisting essentially of 0.5 to 35 parts of a water soluble chloride, 0.5 to 20 parts of a molybdenum source selected from the group consisting of ammonium molybdate and molybdic acid and 0.01 to 10 parts of acetate ions dissolved in water to give a product containing ½ to 3 ounces of said constituents per gallon.

6. A composition according to claim 5 wherein the molybdenum source is ammonium molybdate.

7. A composition according to claim 1 wherein the molybdenum source is ammonium molybdate.

8. A composition according to claim 2 dissolved in sufficient water to give a product having ½ to 3 ounces per gallon of said salts.

9. A composition consisting essentially of ½ to 2½ ounces per gallon of 8 parts nickel chloride, 48 parts ammonium chloride, 35 parts of ammonium molybdate, 3 parts sodium diacetate, 3 parts sodium acetate and 3 parts sodium bifluoride all dissolved in water.

10. A composition according to claim 5 wherein there is present a small but effective amount of a reducing agent selected from the group consisting of formic acid, formaldehyde, a formate, a hypophosphite and a thiosulfate.

11. A composition according to claim 5 maintained at a pH of 2.5 to 6.0.

12. A process of blackening a metal surface from the class consisting of steel, zinc, aluminum, nickel and magnesium comprising immersing the metal in the solution of claim 5, said solution having a pH between about 2.5 and 6.0 and a temperature between about 120° and 180° F.

13. A composition according to claim 1 including also a member selected from the group consisting of 0.1 to 2 parts of a water soluble nickel salt, 0.067 to 4 parts of a water soluble fluoride and mixtures thereof.

14. A composition according to claim 5 including also a member selected from the group consisting of 0.1 to 2 parts of a water soluble nickel salt, 0.067 to 4 parts of a water soluble fluoride and mixtures thereof.

15. A process according to claim 12 wherein there is present also a member selected from the group consisting of 0.1 to 2 parts of a water soluble nickel salt, 0.067 to 4 parts of a water soluble fluoride and mixtures thereof.

References Cited in the file of this patent

UNITED STATES PATENTS

| | | |
|---|---|---|
| 1,095,357 | Roux | May 5, 1914 |
| 2,415,651 | Nechamkin | Feb. 11, 1947 |
| 2,679,475 | Singler | May 25, 1954 |
| 2,876,116 | Jendrzynski | Mar. 3, 1959 |